United States Patent [19]

Held-Elbert et al.

[11] Patent Number: 4,691,337
[45] Date of Patent: Sep. 1, 1987

[54] METHOD AND APPARATUS FOR DETERMINING THE VALUE OF ANALOG VOLTAGES OCCURRING ON TELEPHONE SUBSCRIBER LINES OF A DIGITAL TELEPHONE EXCHANGE

[75] Inventors: Gabriele Held-Elbert, Lochhofen; Wolfgang Kaiser, Munich; Werner Schmutzler, Fuerstenfeldbruck, all of Fed. Rep. of Germany

[73] Assignee: Siemens Aktiengesellschaft, Berlin and Munich, Fed. Rep. of Germany

[21] Appl. No.: 849,653

[22] Filed: Apr. 9, 1986

[30] Foreign Application Priority Data

Apr. 30, 1985 [DE] Fed. Rep. of Germany ....... 3515613

[51] Int. Cl.$^4$ .............................................. H04B 3/46
[52] U.S. Cl. ......................................... 379/24; 379/26
[58] Field of Search .............................. 379/26, 22, 24

[56] References Cited

U.S. PATENT DOCUMENTS

Re. 30,692 7/1981 Ellson .......................... 179/175.3 R

Primary Examiner—Stafford D. Schreyer
Attorney, Agent, or Firm—Adel A. Ahmed; Thomas H. Jackson

[57] ABSTRACT

Analog voltages are collected by scanning the two wires of a subscriber line; the values are subjected to an analog-digital conversion and fed to a microprocessor (MC) which computes the desired measuring values from the results of said conversion. Thus, from a single measuring operation performed at two measuring points, nine different voltage values can thus be obtained including dc, ac and external voltages between each wire and ground and between the two wires.

5 Claims, 3 Drawing Figures

METHOD AND APPARATUS FOR DETERMINING THE VALUE OF ANALOG VOLTAGES OCCURRING ON TELEPHONE SUBSCRIBER LINES OF A DIGITAL TELEPHONE EXCHANGE

BACKGROUND OF THE INVENTION

1. Technical Field

The invention concerns a method and apparatus for determining values of analog voltages occurring on telephone subscriber lines of a preferably digital telephone exchange, particularly for the purpose of locating faults.

Of particular interest in this connection is the determination of direct current voltage, alternating current voltage, and any external influencing voltages, which in each case are measured relative to ground on the two wires of the subscriber line, as well as the three types of voltages between the two wires of the subscriber line.

2. Description of the Prior Art

Until now, the process for determining these voltage values consisted of taking separate measurements for the three types of voltages at three different measuring points, i.e., on each of the subscriber line wires referenced to ground and between the subscriber line wires located at the subscriber line circuit, which means that, in order to acquire a comprehensive general idea of the line condition, a total of nine measurements had to be performed.

It is the object of the present invention to provide a measuring technique which can be performed more simply, which leads more quickly to complete results, and which is especially suitable for an automated process.

SUMMARY OF THE INVENTION

The problem is solved by the present invention in that the analog voltage values prevalent at a point at the subscriber line circuit conducting ground potential are scanned separately at periodic intervals at the two, tip and ring, wires (wire a and wire b) of the subscriber line and are subjected respectively to an analog-digital conversion; that the corresponding two digital values, as well as a digital value corresponding to the difference between the scanning values, are stored in the storage locations of a pair of correspondingly allocated storage locations; that during an interval equivalent to the longest a.c. voltage period which can be expected, the digital values obtained from subsequent scanning are compared respectively with the two corresponding stored digital values, whereupon, depending on whether the newly obtained values are larger than one or smaller than the other stored digital value, they replace one or the other of said digital values, so that each time the maximum value and minimum value of the voltages, which are valid for said interval, are maintained; and that the d.c. voltage value, the a.c. voltage value, and the external voltage value, between the wires of the subscriber line or between said wires and the circuit point conducting ground potential are respectively determined mathematically and separately from said maximum and minimum values.

According to the present invention, the entire measuring complex will thus be reduced to two measurements at two measuring points, as opposed to nine measurements at three measuring points, and from these values the results can be easily determined by means of a microcomputer, since the measuring values were obtained by digitalization.

According to a further development of the present invention, three successively determined maximum and minimum values are respectively so determined that the largest maximum value and the smallest minimum value are discarded and a mean value is obtained for each remaining pair of values, and that said mean value or a new mean value which is obtained from a series of mean values consisting of at least two of said mean values, then forms the basis for determining said voltage values.

According to another development of the present invention, a comparison voltage and the said reference voltage will, at least at the beginning of each determining process, be fed to the measuring and gating circuit, instead of said scanning values; and from the value of the difference of the digital values resulting therefrom and the value of the comparison voltage, a transmission factor of the measuring and gating circuit can be determined, which will be taken into consideration during the subsequent determination of said voltage values in accordance with their correlation to the determined maximum and minimum voltage values. Consequently, adjustment of the measuring equipment by means of potentiometers, which is normally necessary due to aging of component parts and component tolerances, will be rendered superfluous. The transmission factor can also be determined by a microprocessor.

In a preferred embodiment of a circuit arrangement for accomplishing the invention, a multiplexer is provided which successively conducts the analog measuring voltages of the two measuring points, i.e. those of the a-wire and the b-wire, to an A/D converter which is common to both measuring points. This circuit variant is possible as an alternative to a circuit variant in which an A/D converter is allocated to each measuring point, when an A/D conversion is to be performed with a high degree of resolution, since an additional, suitable A/D converter is relatively expensive.

In the following, the invention is explained by embodiments, while reference is made to the enclosed drawings.

DETAILED DESCRIPTION

Figure 1:
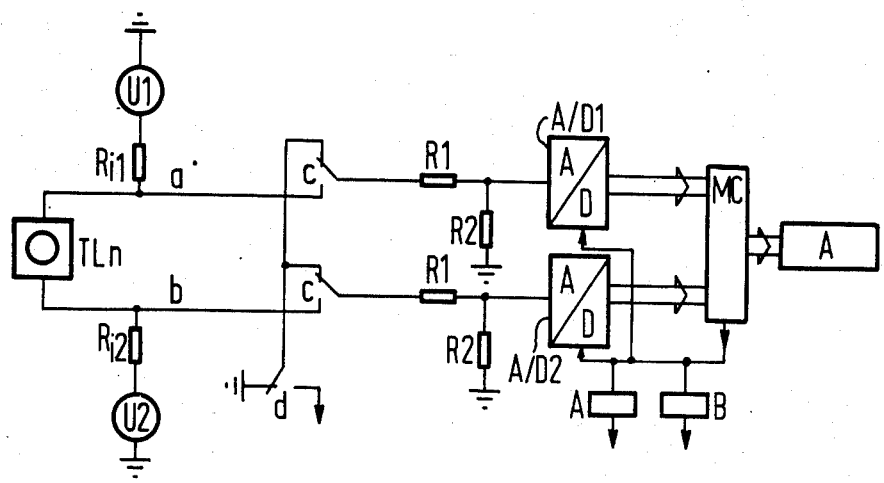
FIG. 1 is a first embodiment of a circuit arrangement for accomplishing the method in accordance with the invention.

For purposes of clarification, FIG. 1 shows to the left a subscriber station TLn as well as a subscriber line with the line wires a and b. Voltages are applied via shunt resistors Ri1 and Ri2 and by voltage sources U1 and U2 with interfering voltages which are to be measured by the measuring circuit. To the right is located the actual measuring circuit for performing the method in accordance with the invention.

The measuring circuit detects the voltages occurring between the a-wire and b-wire as well as between each of these and ground potential. For this purpose said measuring circuit is applied through contacts c of a relay C to said wires. In the alternate circuit position of the contacts c, either a reference voltage Uv or ground potential—depending on the circuit position of a contact d of a relay D—is applied to the measuring circuit at their inputs.

A voltage divider, which is formed respectively by resistor combinations R1 and R2, causes the voltages to drop at the a-wire and the b-wire to a value suitable for the measuring circuit. The voltage values reduced by said method are fed to an A/D converter A/D1 or A/D2 and from there, in the form of a suitable digital value, to a microprocessor MC which determines, as described below, the desired resulting values and shows them on a display A.

Figure 2:
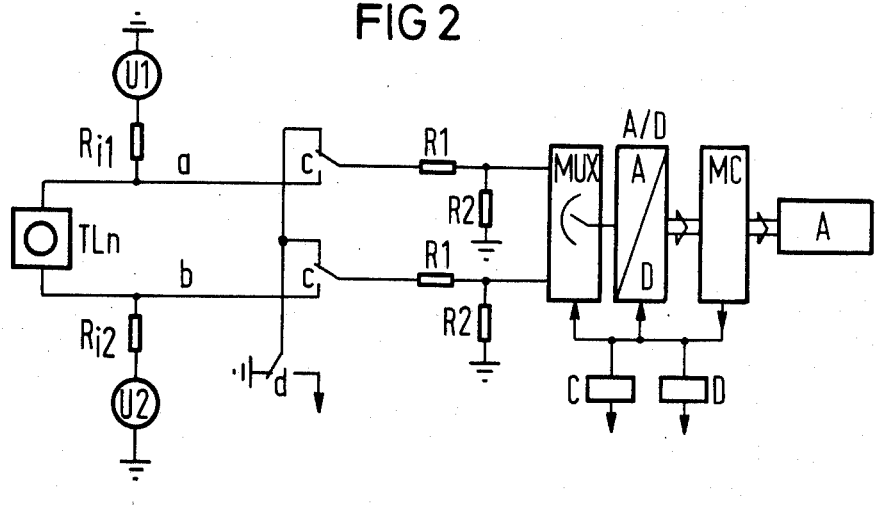
FIG. 2 is a second embodiment of said circuit arrangement.

The only difference between FIG. 2 and FIG. 1 is that, instead of individual measuring points of the A/D converters A/D1 and A/D2, there are provided a single individual A/D converter and a multiplexer MUX which successively feeds to said A/D converter the measuring values which are fed to said multiplexer and originate from the a-wire and the b-wire.

Figure 3:
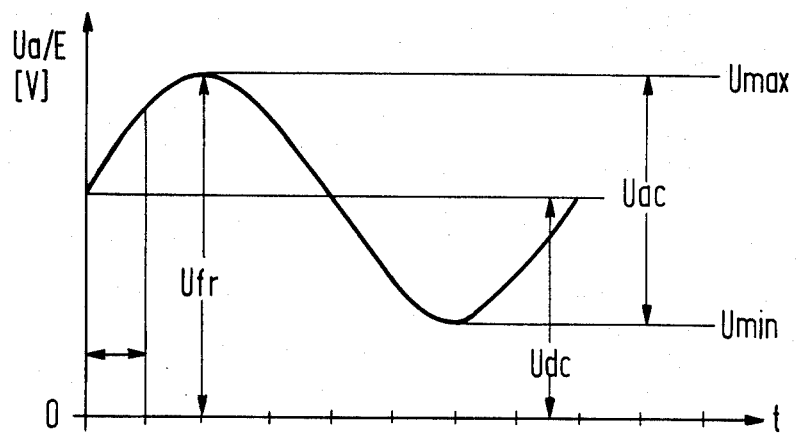
FIG. 3 is a time-dependency diagram of one of the voltages occurring between the wires of the subscriber line and a circuit point conducting ground potential.

With further reference to FIG. 3, the following describes the processes which are related to determining the voltages prevalent between the a-wire and the circuit point of the subscriber line circuit conducting the ground potential.

As stated above, a comparison voltage and ground potential will, at least prior to the commencement of said determining process, be fed successively to the measuring and gating circuit as a reference voltage. For this purpose, the contacts c of the relay C are located in the position shown, and the contact d of the relay D successively moves between the shown and the alternate position, so that the comparison voltage UV and ground potential are fed to the A/D converters A/D1 and A/D2 or to the multiplexer MUX.

In connection with the voltage Ua/E, which occurs between the a-wire of the subscriber line and the circuit point conducting the ground potential, and the corresponding digital value UA/D, which occurs at the output of the A/D converter A/D1, there exists the following correlation:

$$Ua/E = H \cdot UA/D$$

where H designates the transmission function of the measuring circuit. Siad transmission function can be determined from the values obtained from the aforesaid measurements. AT the same time, the difference between the value of the measured d.c. voltage and ground potential is used for zero-point correction, as the actual analog comparison voltage UV (A). The transmission function is then determined by the microprocessor MC in accordance with the correlation:

$$H = \frac{Ua/E}{UA/D} = \frac{UV(A)}{UV(A/D)}$$

For practical purposes, the above measurements for determining the transmission function are performed not only prior to the commencement of each determining process of the desired measuring voltage but also prior to each scanning of the a-wire and b-wire.

In order to perform the actual measuring, the contacts c take up the circuit position which is not shown, whereby the analog voltage values prevalent between the a-wire and the ground potential or between the b-wire and the ground potential are fed to the A/D converters A/D1 and A/D2 or to the single A/D converter A/D and thus, as corresponding digital values, to the input of the mircroprocessor MC.

As indicated above, the d.c. voltage, the a.c. voltage and a possibly occurring external voltage contribution are of interest at the said measuring points. The resulting d.c. voltage, as is shown in FIG. 3, corresponds to the correlation:

$$Udc = Umin + \frac{Umax - Umin}{2}$$

The resulting a.c. voltage contribution is in accordance with the correlation:

$$Uac = \frac{Umax - Umin}{2 \times \sqrt{2}}$$

And finally, the formulas $$Ufr = Umax, \text{ when } |Umax| \geq |Umin|$$

$$Ufr = Umin, \text{ when } |Umin| > |Umin|$$

apply to the calculation of external voltage contribution.

The required voltage values Umax and Umin can now be determined as follows from the voltage values which are scanned and subjected to an A/D conversion:

The corresponding digital values, which are fed to the microprocessor, are first multiplied by the values of the transmission function and subsequently, upon their first emergence, stored in a pair of storage locations which is allocated in this case to the voltage prevalent between the a-wire and the ground potential. Corresponding pairs are allocated individually between the b-wire and the ground potential and the voltage prevalent between the two wires. One of the two storage locations of the pairs serves to store voltage Umax, and the other to store voltage Umin.

The subsequently measured respective scanning values are compared with the storage content of the pair of storage locations, and provided that they are more positive than the content of the storage location allocated to voltage Umax, they will be substituted as the new value of said storage location, and, in the event that they are more negative than the content of the storage location allocated to voltage Umin, they will be substituted as the content of its respective storage location. After a given measuring period, which is equal to the longest a.c. voltage period which can be expected, the storage location will then contain the actual values for Umax and Umin used for the determination process. The values for the voltage Ua/b between the two wires of the subscriber line are calculated by finding the difference of the voltage measured between the a-wire and the circuit point conducting the ground potential and between the b-wire and the circuit point conducting the ground potential.

The precision of the extreme value formation is determined by the scan interval to a.c. voltage period ratio.

As described above, to prevent the ultimate values of the extreme values Umax and Umin from being influenced by sporadic voltage peaks, a value will only be accepted by the storage location after the values of three successive scannings have been obtained, of which the extreme value remains unconsidered, and the two remaining values are used for forming the mean value which then is the value to be accepted by the storage location. The latter process can be repeated several times for the purpose of increasing precision, such that a value is accepted as the value mean value, which is produced by taking the means of several such mean values through a mean value accumulation process.

From the valus thus obtained for Umax and Umin, the values desired for the d.c. voltage Udc, the a.c. voltage contribution Uac, and the external voltage contribution Ufr are then, in accordance with the above formulae, determined for all three measuring points by means of a microprocessor and may be shown on the display A.

Thus, there has been shown and described a novel method and apparatus for taking analog voltage measurements on a subscriber line, only limited in scope by the claims which follow.

What is claimed is:

1. A method for determining the values of analog voltages occurring on subscriber lines of a preferably digital telephone exchange, particularly for the purpose of locating faults, characterized by the steps of scanning separately first and second analog voltage values prevalent at a point of a subscriber line circuit for ground potential at periodic intervals with reference to the two wires of a subscriber line and performing for each voltage value respectively an analog-digital conversion; storing the respective first and second digital values, as well as a digital value corresponding to the difference between the scanning values in storage locations of a pair of correspondingly allocated storage locations; that during an interval equivalent to the longest a.c. voltage period which reasonably can be expected, comparing the digital values obtained from a subsequent scanning respectively with the first and second corresponding stored digital values, whereupon, depending on whether said values are larger than one or smaller than the other stored digital value, replacing one or the other of said digital values, so that, each time, the maximum value and minimum value of the voltages, which are valid for said interval, are maintained; and determining respectively the d.c. voltage value, the a.c. voltage, and the external voltage value, between the wires (a,b) of the subscriber line or between each of said wires and the circuit point conducting the ground potential from said maximum and minimum values.

2. A method as defined in claim 1 further characterized by the steps of determining three successive maximum and minimum values so that the largest maximum value and the smallest minimum value are discarded and a mean value is obtained for each remaining pair of values, and determining the voltage values from said mean value or new mean value, obtained from a series of mean values consisting of at least two of said mean values.

3. A method as defined in claim 1 further characterized by the step of feeding a comparison voltage and the said ground potential at least at the beginning of each determining process, to a measuring and gating circuit, before feeding said scanning values; and from the value of the difference of the digital values resulting therefrom and the value of the comparison voltage, determining a transmission factor for the measuring and gating circuit which will be taken into consideration during a subsequent determination of said voltage in accordance with their correlation to the determined maximum and minimum voltage values.

4. A circuit arrangement of a subscriber line circuit for carrying out an analog voltage determination method on a subscriber telephone line in accordance with the method recited in claim 1 characterized by the fact that said circuit arrangement comprises a microprocessor (MC) for calculating a transmission factor for the circuit arrangement, and maximum and minimum measured, analog values, as well as values for DC voltage, AC voltage and external voltage between either of two wires of the subscriber line and ground and between the two wires.

5. A circuit arrangement as defined in claim 4 further characterized by the fact that said circuit arrangement further comprises a multiplexer (MUX) which successively conducts analog measuring voltage values of two measuring points to a single A/D converter, common to both measuring points.

* * * * *